US009134490B2

(12) United States Patent
Feng et al.

(10) Patent No.: US 9,134,490 B2
(45) Date of Patent: Sep. 15, 2015

(54) PASSIVE ALIGNMENT MULTICHANNEL PARALLEL OPTICAL SYSTEM

(71) Applicant: LaXense Inc., Walnut, CA (US)

(72) Inventors: Ningning Feng, Arcadia, CA (US); Xiaochen Sun, Pomona, CA (US)

(73) Assignee: LAXENSE INC., Walnut, CA (US)

( * ) Notice: Subject to any disclaimer, the term of this patent is extended or adjusted under 35 U.S.C. 154(b) by 397 days.

(21) Appl. No.: 13/706,674

(22) Filed: Dec. 6, 2012

(65) Prior Publication Data

US 2014/0161396 A1    Jun. 12, 2014

(51) Int. Cl.
*G02B 6/42* (2006.01)
*G02B 6/36* (2006.01)

(52) U.S. Cl.
CPC .............. *G02B 6/423* (2013.01); *G02B 6/4243* (2013.01); *G02B 6/4246* (2013.01); *G02B 6/4202* (2013.01); *G02B 6/4274* (2013.01)

(58) Field of Classification Search
CPC .... G02B 6/4249; G02B 6/423; G02B 6/4231; G02B 6/4228; G02B 6/4236; G02B 6/4242; G02B 6/424; G02B 6/4243; G02B 6/4202; G02B 6/4219; G02B 6/43; G02B 6/4246; G02B 6/4274

See application file for complete search history.

(56) References Cited

U.S. PATENT DOCUMENTS

| | | | |
|---|---|---|---|
| 4,779,946 A | 10/1988 | Pimpinella et al. | |
| 5,259,054 A | 11/1993 | Benzoni et al. | |
| 5,420,954 A * | 5/1995 | Swirhun et al. | 385/92 |
| 5,428,704 A * | 6/1995 | Lebby et al. | 385/92 |
| 5,631,988 A * | 5/1997 | Swirhun et al. | 385/89 |
| 5,905,831 A | 5/1999 | Boudreau et al. | |
| 5,913,002 A | 6/1999 | Jiang | |
| 6,095,697 A * | 8/2000 | Lehman et al. | 385/88 |
| 6,272,272 B1 * | 8/2001 | Ford | 385/52 |
| 6,318,909 B1 * | 11/2001 | Giboney et al. | 385/90 |
| 6,511,235 B2 | 1/2003 | Wu et al. | |
| 6,741,778 B1 * | 5/2004 | Chan et al. | 385/52 |
| 6,767,142 B2 * | 7/2004 | Stricot et al. | 385/92 |
| 6,821,028 B2 * | 11/2004 | Morris et al. | 385/92 |
| 6,825,065 B2 | 11/2004 | Moon et al. | |
| 6,917,056 B2 | 7/2005 | Dautartas et al. | |
| 7,128,474 B2 * | 10/2006 | Giboney et al. | 385/92 |
| 7,137,746 B2 * | 11/2006 | Kato | 385/94 |
| 7,306,378 B2 | 12/2007 | Alduino et al. | |
| 7,344,318 B2 * | 3/2008 | Lu et al. | 385/88 |
| 7,352,969 B2 | 4/2008 | Kim et al. | |
| 7,914,210 B2 * | 3/2011 | Schweiker | 385/88 |
| 2002/0025122 A1 * | 2/2002 | Ouchi et al. | 385/88 |
| 2002/0085816 A1 * | 7/2002 | Nishimura | 385/89 |

(Continued)

*Primary Examiner* — Rhonda Peace
(74) *Attorney, Agent, or Firm* — Chen Yoshimura LLP (57) ABSTRACT

The invention provides an optical system, in particular, a multi-channel parallel optical transceiver system and methods of forming the same. The multi-channel parallel optical system includes a first substrate with at least one optical component mounted on its first side, a second substrate with optical fibers affixed in fiber fixing structures (grooves), the second substrate being mounted on the first side of the first substrate perpendicular to the first side of the first substrate so that the optical signal can be transmitted and received between the optical fibers and the mounted optical components with minimum loss. Passive alignment assembly is realized by using a series of alignment pins and holes and/or grooves pre-fabricated on the substrates. The optical systems may additionally include other structures to provide additional functionalities, in-line monitor photodetectors, and mechanical support or substrate elevation.

11 Claims, 12 Drawing Sheets

(56) References Cited

U.S. PATENT DOCUMENTS

| | | | |
|---|---|---|---|
| 2002/0126964 A1* | 9/2002 | Blom et al. | 385/88 |
| 2003/0034438 A1* | 2/2003 | Sherrer et al. | 250/216 |
| 2007/0085215 A1 | 4/2007 | Budd et al. | |
| 2012/0263411 A1* | 10/2012 | Kim et al. | 385/14 |
| 2013/0301982 A1* | 11/2013 | Lee | 385/14 |
| 2014/0161396 A1* | 6/2014 | Feng et al. | 385/83 |

* cited by examiner

PASSIVE ALIGNMENT MULTICHANNEL PARALLEL OPTICAL SYSTEM

BACKGROUND OF THE INVENTION

1. Field of the Invention

The invention relates generally to systems and methods of optical micro-assemblies. In particular, the invention relates to passive alignment micro-assembled optoelectronic modules forming multichannel parallel optical systems with optical transmitters, including monitor photodetectors, and optical receivers.

2. Description of the Related Art

Optoelectronic systems used for communications usually consist of an optical transmitter and an optical receiver. The optical transmitter usually consists of a plurality of light emitting devices to generate light signal and encoder structures to encode electrical signals into optical signals by modulating the light, a plurality of light coupling elements (such as lenses, mirrors, gratings) and a plurality of fibers used to carry light signals along a distance. The receiver usually consists of a plurality of photodetectors to decode optical signals into electrical signals, a plurality of light coupling elements, and a plurality of fibers. For relatively short-distance data communication applications, the light emitting devices are usually surface-emitting lasers and the photodetectors are usually surface-receiving photodetectors.

The traditional TO (transistor outline) assembling technology places a single laser or a single photodetector on a TO base and affixes a cap having a lens window and a single optical fiber onto the TO base using passive or active alignment to form the whole TO package. A transmitter TO package may also include a mirror structure to deflect some laser light and a monitor photodetector to detect the deflected light for real-time laser power monitoring during practical operations. This well-established assembling and packaging method is limited in that the TO package is only able to contain a single photodetector, or a single laser and a monitor photodetector.

Ever increasing bandwidth demand for data transmission requires multiple-channel transmitters, receivers, or combined transceivers within a single package for higher density of total bandwidth per volume. Beginning with small form-factor pluggable (SFP) for single channel transceiver applications, a number of standard transceiver packages have been established by the industry, e.g. quad SFP plus (QSFP+) for four-channel transceivers, compact form-factor pluggable (CFP) for ten-channel transceivers. These multiple-channel transceivers, however, cannot simply adopt multiple traditional TO sub-packages due to the small form-factor of the package. Assembling a plurality of lasers (and monitor photodetectors), photodetectors, and fibers into a single and small platform, and placing the platform inside the standard multi-channel transceiver packages along with other electronic chips are the key technology for transceiver module manufactures.

Although active alignment packaging approach has been widely adopted in edge-emitting optoelectronics assemblies, passive alignment assembling processes, in which the fibers are aligned and attached to lasers or photodetectors without active adjustment, have the advantages of higher throughputs and lower costs than active alignment procedures. The existing prior passive alignment processes include: using a molded plastic fixture with a plurality of lenses and a reflector to hold a fiber and reflect the light; using an etched v-groove (or u-groove) trench to hold a fiber and an etched reflector to reflect the light; and using a through-substrate hole to hold a fiber and a flip-chip bonded laser or photodetector array facing the fiber facet on the substrate.

SUMMARY OF THE INVENTION

The present invention is directed to a passive alignment micro-assembled optoelectronic modules forming multichannel parallel optical systems with optical transmitters, including monitor photodetectors, and optical receivers, and related fabrication methods that substantially obviates one or more of the problems due to limitations and disadvantages of the related art.

Features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an optical system which includes: a first substrate having a first side; at least one optical component mounted on the first side of the first substrate, wherein each of the at least one optical component has a first side and a second side facing opposite to the first side with an optical surface on the first side, wherein the optical surface is capable of detecting and/or emitting optical signals, and wherein the second side of the optical component is mounted onto the first side of the first substrate; a second substrate having a first side with at least one fiber placement groove formed on the first side; and at least one optical fiber placed inside the at least one fiber placement groove; wherein the first side of the second substrate and the at least one fiber placement groove are disposed perpendicular to the first side of the first substrate, and wherein the optical fiber is optically coupled with the optical surface of the at least one optical component.

The optical system may further include: a fourth substrate having a first side and a second side facing generally opposite to the first side, the first side and second side of the fourth substrate being parallel to the first side of the first substrate and perpendicular to the first side of the second substrate, the fourth substrate defining at least one fiber placement hole extending from its second side to its first side, the at least one fiber placement hole being aligned with the at least one fiber placement groove on the first side of the second substrate, wherein the at least one optical fiber penetrates through the at least one fiber placement; and at least one third substrate including a first side and a second side facing opposite to the first side, the at least one third substrate being disposed between the first substrate and fourth substrate with the first and second sides of the third substrate being in contact with the first side of the first substrate and the second side of the fourth substrate, respectively, wherein a gap is defined between the first side of the first substrate and the second side of the fourth substrate and the at least one optical component is partially disposed within the gap, wherein the optical surface of the at least one optical component includes at least one laser diode, wherein the fourth substrate includes at least one photodetector on its second side configured to receive an optical signal emitted from the at least one laser diode to generate an electrical signal indicative of an intensity of the optical signal.

In another aspect, the present invention provides a method of fabricating an optical system, which includes: providing a first substrate having a first side; mounting at least one optical component on the first side of the first substrate, each of the at least one optical component having a second side mounted onto the first side of the first substrate and a first side facing opposite to the second side with an optical surface on the first side; providing a second substrate having a first side; forming at least one fiber placement groove on the first side of the second substrate; placing at least one fiber inside the at least one fiber placement groove; and placing the second substrate such that the first side of the second substrate and the at least one fiber placement groove are perpendicular to the first side of the first substrate, wherein the optical surface of the at least one optical component is optically coupled to an end of the fiber.

In another aspect, the present invention provides a method of fabricating an optical system, which includes: providing a first substrate having a first side; mounting at least one optical component on the first side of the first substrate, each of the at least one optical component having a second side mounted onto the first side of the first substrate and a first side facing opposite to the second side with an optical surface including a laser diode on the first side; providing a fourth substrate having a first side and a second side facing opposite to the first side; forming at least one hole extending between the second side and the first side of the fourth substrate; forming at least one photodetector on the second side of the fourth substrate; providing at least one third substrate having a first side and a second side facing opposite to the first side; placing the at least one third substrate between the first side of the first substrate and second side of the fourth substrate, wherein the at least one photodetector is optically coupled with the laser diode mounted on the first side of the first substrate, the at least one photodetector being responsive to an optical signal from the laser diode to generate an electrical signal indicative of an intensity of the optical signal; providing a second substrate having a first side; forming at least one fiber placement groove on the first side of the second substrate; placing at least one fiber inside the at least one fiber placement groove with an end of the fiber protruding from an end face of the second substrate; and placing the second substrate on the first side of the fourth substrate such that the first side of the second substrate and the at least one fiber placement groove are perpendicular to the first side of the fourth substrate, and inserting the protruded end of the at least fiber into the at least one hole of the fourth substrate.

It is to be understood that both the foregoing general description and the following detailed description are exemplary and explanatory and are intended to provide further explanation of the invention as claimed.

DETAILED DESCRIPTION OF THE PREFERRED EMBODIMENTS

The invention provides an optical system, in particular, a multi-channel parallel optical transceiver system, and related methods for forming the same. According to an embodiment of the present invention, a multi-channel parallel optical system includes a first substrate with at least one optical component mounted on the first side of the substrate, a second substrate with optical fibers affixed in fiber fixing structures, such as V-shaped grooves, mounted on the first side of the first substrate in the way that the optical ends of the optical fibers are aligned with the optical surfaces of the mounted optical components so that the optical signal can be transmitted and received between the optical fibers and the mounted optical components with minimum loss. The optical systems may include other substrates to provide additional functionalities, such as passive alignment, in-line monitor photodetectors, and mechanical support or substrate elevation. Although the described optical system can be formed of substrates made of various materials, silicon based substrates are preferable for their low-cost and matured material processing technology. The typical thickness of silicon substrate is, but not limited to, between 300 μm to 700 μm. In case of III-V substrates, the typical thickness is, but not limited to, between 100 μm to 400 μm.

Figure 1A:
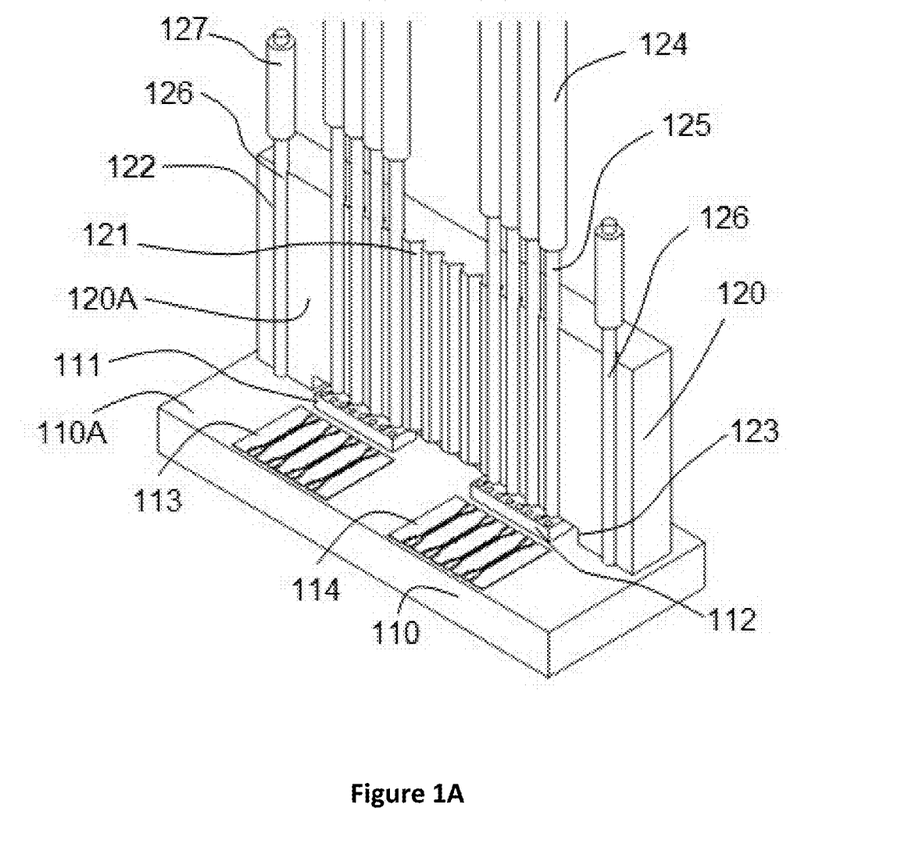
FIG. 1A schematically illustrates an isometric view of an exemplary optical system according to an embodiment of the present invention.
Figure 1B:
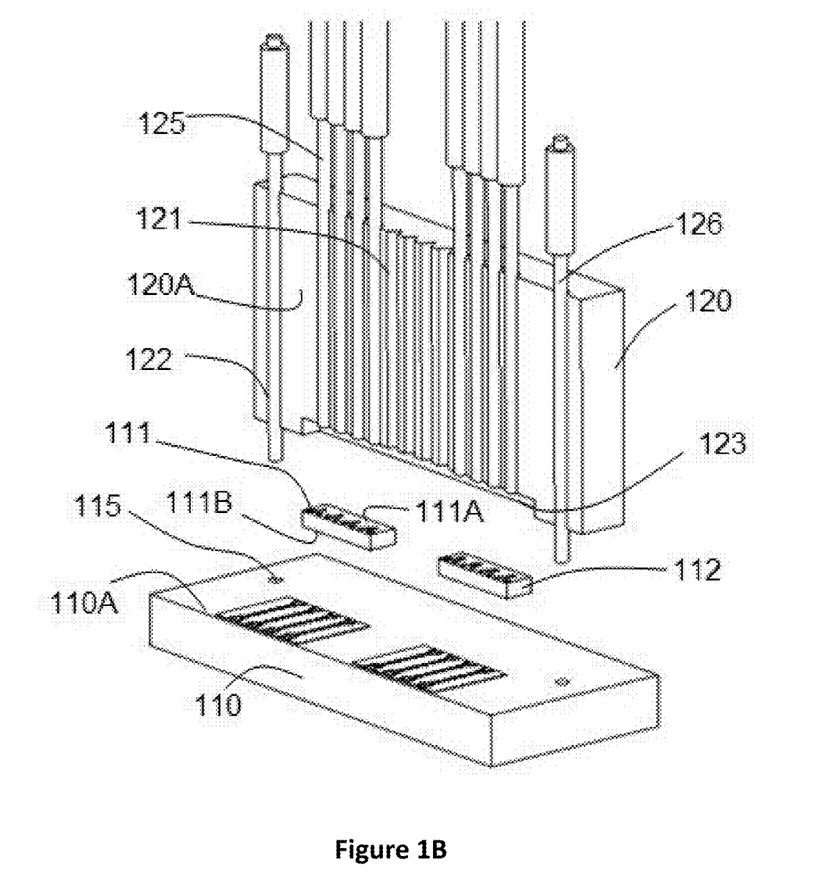
FIG. 1B schematically illustrates an exploded isometric view of the optical system schematically illustrated in FIG. 1A.
Figure 1C:
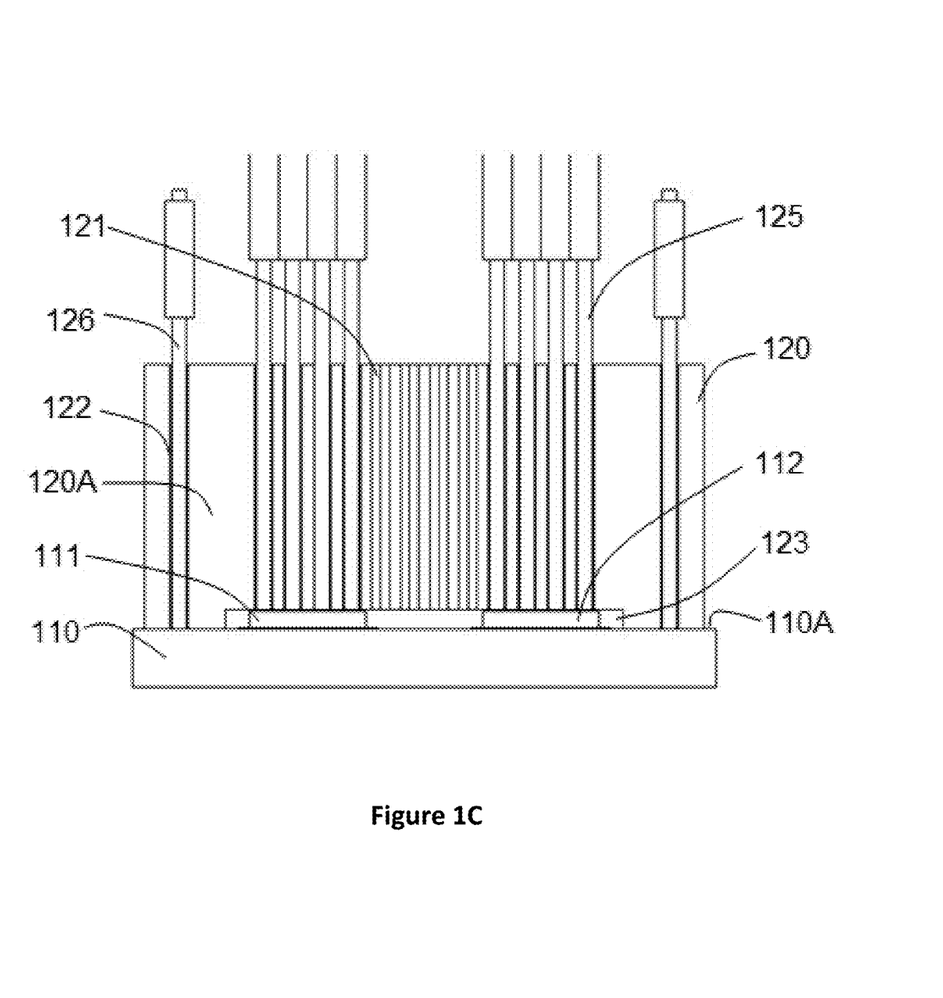
FIG. 1C schematically illustrates a front view of the optical system schematically illustrated in FIG. 1A.

An embodiment of the present invention is described with reference to FIGS. 1A-1D. FIG. 1A schematically illustrates a schematic isometric view of an exemplary optical system. An exploded schematic isometric view of the system is illustrated in FIG. 1B. A schematic front view of the optical system is illustrated in FIG. 1C. The optical system includes a first substrate 110 and a second substrate 120 arranged perpendicular to each other. Each substrate has a first side and a second side facing generally opposite to the first side.

In this disclosure, when one substrate is said to be parallel (or perpendicular) to another substrate, it is meant that the first side of the one substrate is parallel (or perpendicular) to the first side of the other substrate. Further, the term end face is used in this disclosure to refer to a face that is perpendicular to the first side.

At least one optical component 111 and/or 112 is mounted on the first side 110A of a first substrate 110. The at least one optical component 111/112 has a first side 111A and a second side 111B facing generally opposite to the first side with the optical surface on the first side, where the optical surface is capable of detecting and/or emitting optical signals. The second side 111B of the optical component 111/112 is mounted onto the first side 110A of the first substrate 110 so that the optical surface is facing the optical path of an optical signal emitted from or received by at least one optical fiber 125 affixed on the second substrate 120. In other words, the optical surface of the optical component 111/112 and the optical fiber are optically coupled with each other. At least one metal layer 113 and/or 114 is formed on the first side of the first substrate 110. The at least one metal layer 113/114 is configured to be electrically coupled to the at least one optical component 111/112 mounted on the first side of the first substrate (note that in FIG. 1A, to avoid overcrowding, the metal layers 113/114 are not shown as coupled to components 111/112). The first substrate 110 further includes at least one set of alignment holes 115 extending from the first side into the substrate 110 and preferably through to the second side.

Figure 1D:
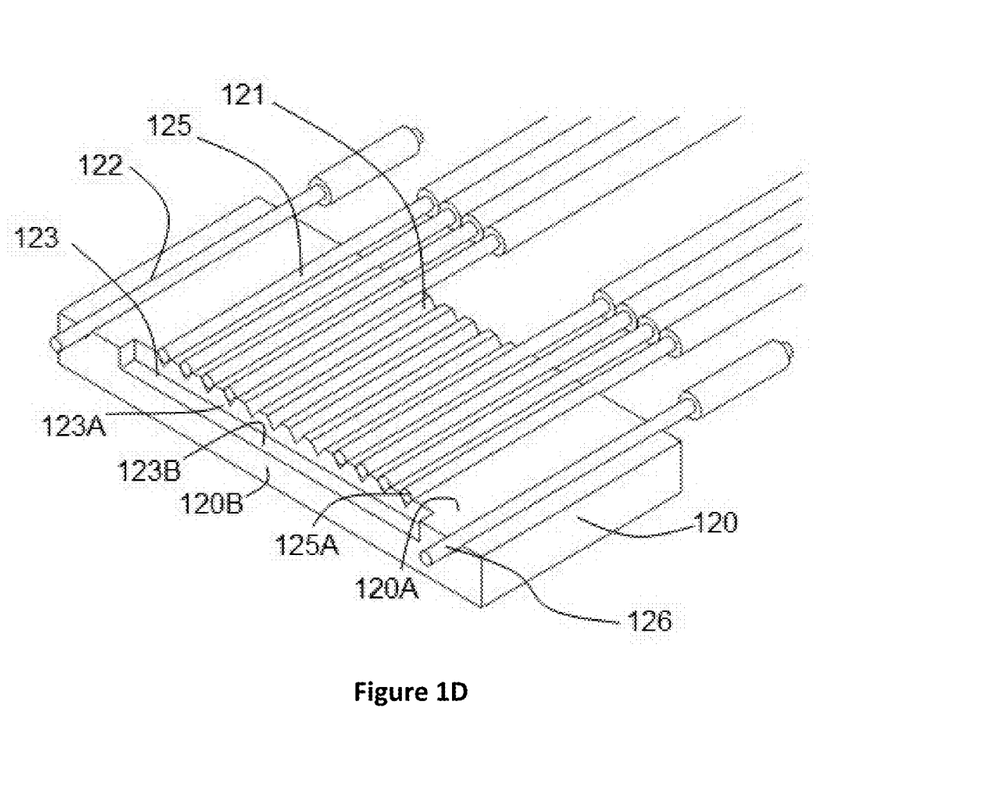
FIG. 1D schematically illustrates an enlarged isometric view of the second substrate (rotated) with the optical fibers and alignment pins of the optical system schematically illustrated in FIG. 1A.

FIG. 1D schematically illustrates an enlarged isometric view of the second substrate 120 (in a view rotated from the view of FIG. 1A) with the optical fibers and alignment pins assembled thereon. In order to achieve better alignment accuracy, optical fibers 126 with the polymer protection layer 127 partially removed are used as alignment pins. At least one V-shaped groove or V-groove 121 is formed on the first side 120A of the substrate 120, wherein at least one fiber 125 with the polymer protection layer 124 partially removed is placed inside the at least one V-shaped groove. In order to maintain accuracy of the optical fiber position, the polymer protection layer 124 is removed from a portion of the optical fiber 125, and only fiber core/cladding 125 is placed inside the V-groove 121. In most cases, the at least one fiber is one fiber ribbon with 4 or 12 fiber in one ribbon. As illustrated in FIG. 1D, a cut 123 is formed on the first side 120A of the second substrate near an edge where the first side joins an end face 120B which is perpendicular to the first side 120A, forming a facet 123A perpendicular to the first side 120A and a facet 123B parallel to the first side. The depth of the cut (i.e. the distance between the facet 123B and the first side) is configured to be larger than the distance from the center of the optical aperture of the fibers 125 to the optical surface of the mounted optical component chip 111/112 (see FIG. 1A), typically in the range of, but not limited to, 50 µm to 200 µm, depending on the specific design of the components. The width of the cut (i.e. the distance between the facet 123A and the end face 120B) is configured to be larger than the chip height (i.e. the distance between chip bottom to the highest point of the optical surface) of the mounted optical component chip 111/112 (see FIG. 1A) to allow enough height clearance when assembled on the first substrate 110. The height of the optical component chips have a height typically in the range of, but not limited to, 100 µm to 400 µm, if made on III-V substrate, and 400 µm to 700 µm if made on silicon substrate. When placed inside the V-grooves, the ends 125A of the optical fibers 125 are configured to be in the same plane of the facet 123A of the cut to provide good optical coupling between the optical components 111/112 and the optical fibers 125. This step can ensure that the distance between the optical fiber ends 125A and the optical surfaces of the optical components 111/112 is well controlled in the range of a few micrometers to tens of micrometers depending on the specific optical design and desired functionalities.

At least one set of alignment V-grooves 122 are formed on the first side 120A of the second substrate 120. The alignment V-grooves 122 are preferably parallel to the V-grooves 121 (the latter may be referred to as fiber placement grooves to distinguish them from the alignment grooves). At least a set of alignment pins 126 are placed inside the at least one set of alignment V-grooves with one end protruding out from the end face 120B of the second substrate 120. The length of the protruding portion is preferably larger than the thickness of the first substrate to allow good alignment accuracy when the alignment pins are inserted into and pass through the alignment holes 115 of the first substrate 110. Optical fibers 126 with partially removed polymer protection layers 127 are used as alignment pins due to their well controlled diameters. The standard optical fiber cladding with removed polymer protection layer has a diameter of 125±0.7 µm (Corning SMF-28). The herein described alignment technology, that is, the fiber core/cladding based alignment pins (with <1 µm variation) combined with the precisely etched alignment holes/V-grooves (size variation around 2 µm), can achieve less 3 µm alignment accuracy, which is significantly more accurate than that achieved by the micro-molding and micro-machining technologies.

When packaging, the optical components 111/112 are mounted on the first side 110A of the first substrate, and the optical fibers 125 and alignment pins 126 are mounted in the V-grooves 121 and 122 on the first side 120A of the second substrate 120. Then the second substrate is positioned (e.g., after it is rotated) so that the first side 120A and the V-grooves 121 and 122 are perpendicular to the first side 110A of the first substrate 110, and the end face 120B faces and joins the first side 110A of the first substrate. To align the ends of the optical fibers 125A with the optical surface of the mounted optical components 111/112, the alignment pins 126 are inserted into the alignment holes 115 on the first substrate 110. Such a process is a passive alignment process, where the alignment process does not involve turning on the active optical components 111/112 and actively aligning the optical axes between the optical fibers and the optical components, therefore saves significant packaging cost.

In this and other embodiments described in this disclosure, the grooves for mounting the fibers and alignment pins may have other shapes, such as a U-shape. The grooves are straight and extend across the entire surface of the first side of the substrate. When multiple grooves are provided, they are preferably parallel to each other.

Figure 2A:
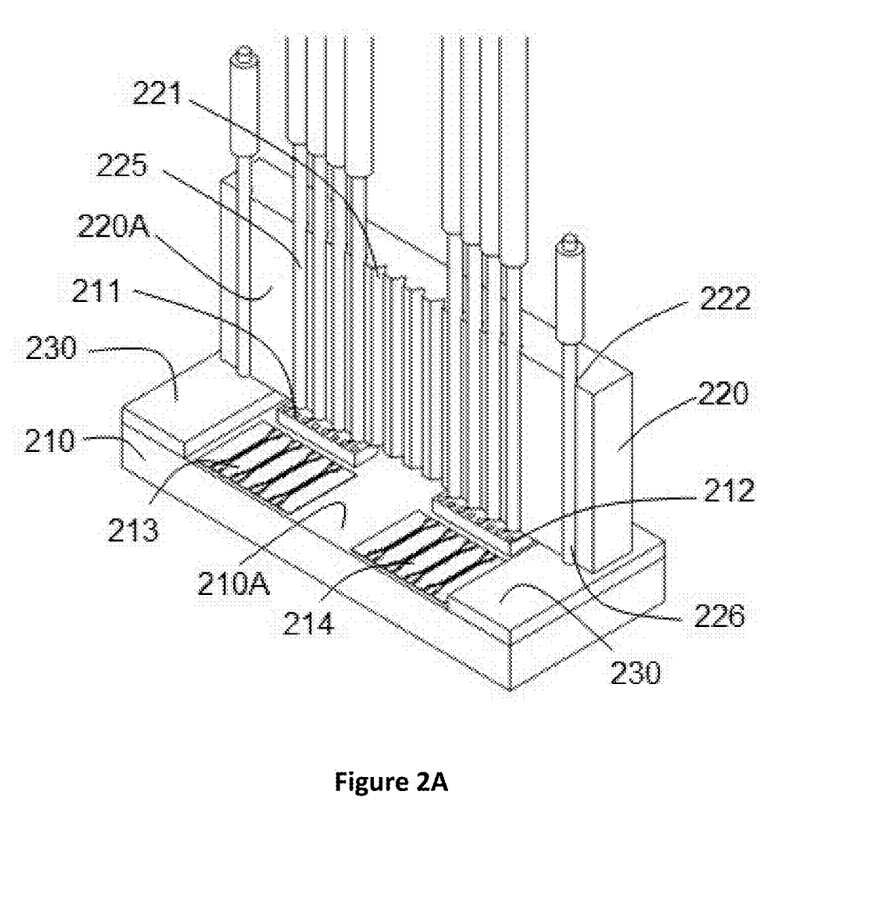
FIG. 2A schematically illustrates an isometric view of an exemplary optical system according to another embodiment of the present invention.
Figure 2B:
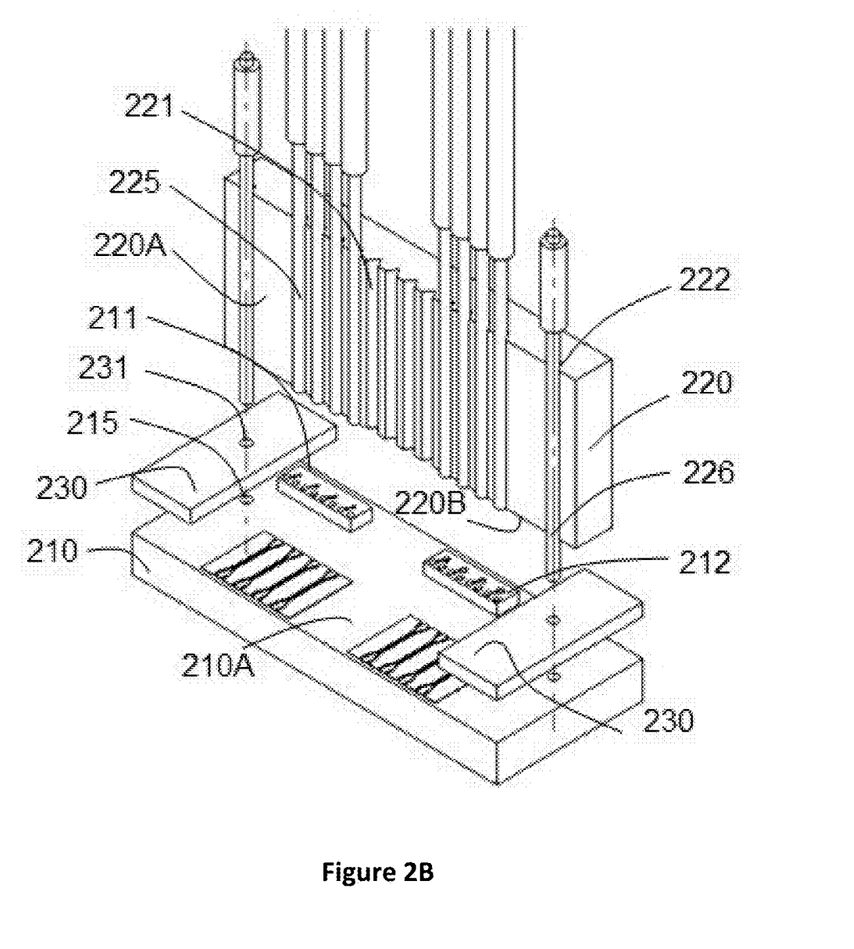
FIG. 2B schematically illustrates an exploded isometric view of the optical system schematically illustrated in FIG. 2A.

FIGS. 2A-2B schematically illustrates another embodiment of the present invention. FIG. 2A illustrates a schematic isometric view of an exemplary optical system of this embodiment. The optical system includes a first substrate 210, a second substrate 220 arranged perpendicular to the first substrate 210, and at least one set of third substrates 230. Each substrate has a first side and a second side facing generally opposite to the first side.

The first substrate 210 has at least one optical component 211/212 mounted on the first side 210A of the substrate with its optical surface facing the optical path of the light emitted from or received by the at least one optical fiber 225 affixed on the second substrate 220. At least one layer of metal 213/214 is configured to be electrically coupled to the optical component 211/212. The second substrate 220 has at least one V-groove 221 and at least one set of alignment V-groove 222 on the first side 220A of the substrate. At least one optical fiber 225 is placed inside the at least one V-groove 221. The end of the optical fiber 225 is configured to be flush with the end face 220B of the substrate 220 that is perpendicular to the first side 220A.

To package the optical system, the optical components 211/212 are mounted on the first side 210A of the first substrate. The optical fibers 225 and alignment pins 226 are placed in the respective V-grooves, and the at least one set of third substrates 230 are attached onto the second substrate 220 by inserting the alignment pins 226 on the second substrate through alignment holes 231 fabricated on the at least one set of third substrates 230. The alignment pins 226 are optical fibers with the polymer protection layer partially removed. The entire module of the combination of the second and third substrates 220 and 230 is positioned (e.g., after it is rotated) so that the first side 220A and the V-grooves 221 and 222 of the second substrate 220 are perpendicular to the first side 210A of the first substrate 210, and attached onto the first side of the first substrate 210 by inserting the alignment pins 226 into alignment holes 215 formed in the first substrate. The process brings the optical fiber ends of fibers 225 to the proximity of the optical surface of the optical components 211/212. In this configuration, the third substrates 230, which have two parallel sides, are used as spacers to control the distance between the end of the optical fibers 225 and the optical components 211/212. The height of the third substrates is in the range of, but not limited to, 100 µm to 700 µm depending on the specific design. The herein described passively alignment process can provide good coupling between the optical fibers 225 and the optical components 211/212 because the alignment can achieve less than 3 µm accuracy in the transverse plane of the optical axis and <1 µm accuracy in the optical axis direction. In some cases, the third substrates 230 can be formed directly on the first side of the first substrate 210 by etching technology.

In the example shown in FIGS. 2A-2B, the set of third substrate 230 are two separate pieces; alternatively, they may be two sections of a single-piece U-shaped substrate.

Figure 3A:
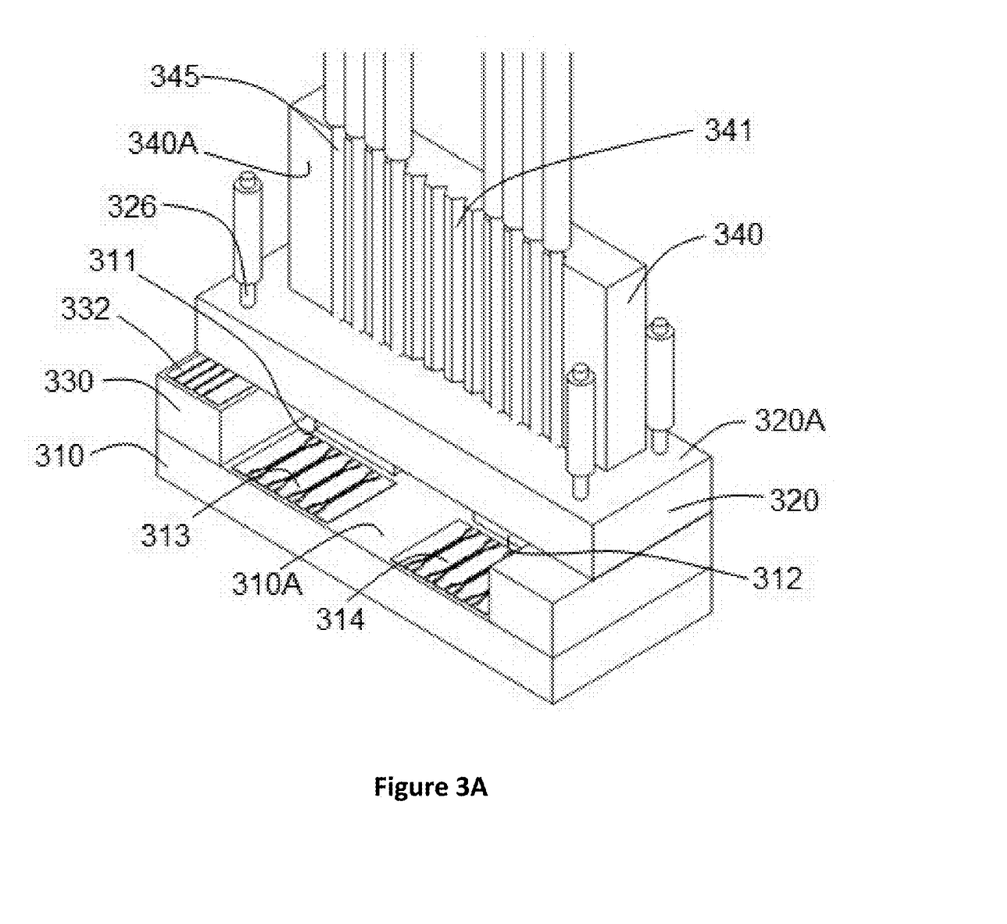
FIG. 3A schematically illustrates an isometric view of an exemplary optical system according to yet another embodiment of the present invention.
Figure 3B:
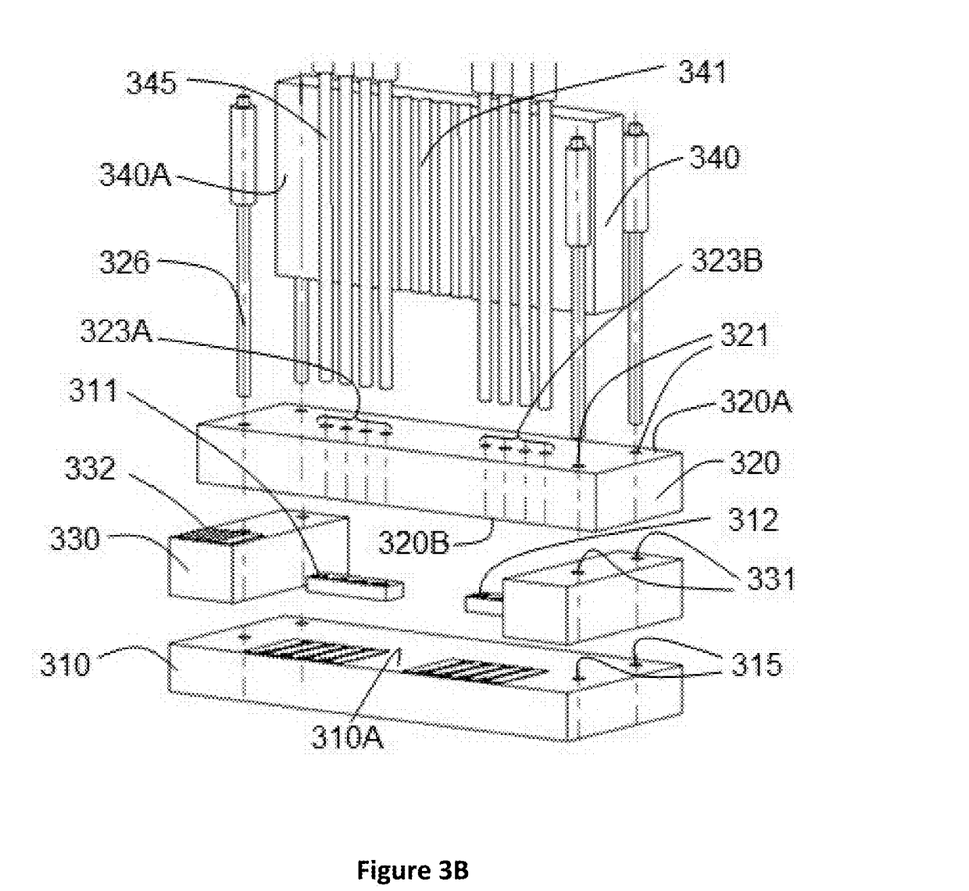
FIG. 3B schematically illustrates an exploded isometric view of the optical system schematically illustrated in FIG. 3A.

FIGS. 3A-3D schematically illustrates another embodiment of the present invention. FIG. 3A illustrates a schematic isometric view of an exemplary optical system of this embodiment. An exploded schematic isometric view of the system is illustrated in FIG. 3B. As shown in FIG. 3A-3B, the optical system includes a first substrate 310, a fourth substrate 320 arranged parallel to the first substrate 310, at least one set of third substrates 330, and a second substrate 340 arranged perpendicular to the first substrate 310. Each substrate has a first side and a second side facing generally opposite to the first side.

At least one optical component 311 and/or 312 is mounted on the first side 310A of a first substrate 310 with its optical surface facing the optical path of an optical signal emitted from or received by at least one optical fiber 345 affixed on the second substrate 340. The at least one optical component is configured to be electrically coupled to the at least one metal layer 313/314 on the first side of the first substrate 310. The first substrate 310 further includes at least one set of alignment holes 315 extending from the first side into the substrate 310 and preferably through to the second side.

Figures 3C, 3D:
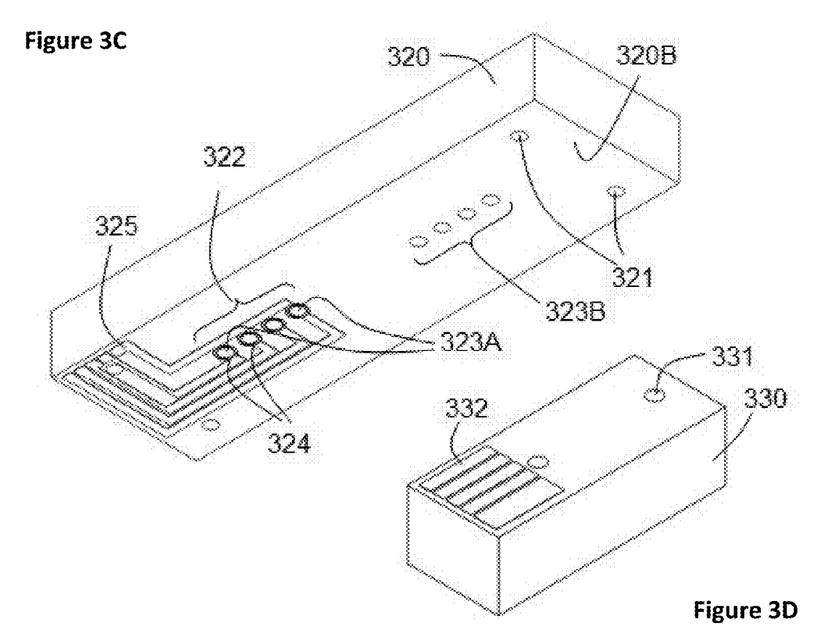
FIGS. 3C and 3D schematically illustrate enlarged isometric views of the second and third substrates, respectively, of the optical system schematically illustrated in FIG. 3A.

FIGS. 3C and 3D illustrate the rotated isometric views of the fourth substrate 320 and the third substrate 330, respectively. At least one through hole 323A and/or 323B is formed on the fourth substrate 320 and extends from the second side 320B to the first side 320A. The at least one hole (referred to as fiber placement holes) is configured to receive at least one optical fiber penetrating through the hole. The fourth substrate 320 further includes at least one photodetector 322 on the second side 320B, wherein the optical aperture 324 of at least one photodetector is configured to be in an optical path of an optical signal emitted from at least one laser diode mounted on the first side 310A of the first substrate 310 (the laser diode may be a part of the optical component 311). The optical aperture 324 of the at least one photodetector has a ring shape surrounding the at least one fiber holes 323A so that the emitted light from the laser-diode on the optical component 311 can be received and absorbed by the ring-shaped photodetector 322. The at least one photodetector 322 is responsive to the optical signal to generate an electrical signal indicative of an intensity of the optical signal. The light-responsive diode (photodetector) 322 may be a p-i-n diode or a p-n diode configured to generate an electric current in response to the optical signal. And the light-responsive diode has a p-doped region, an n-doped region, and a region (the optical aperture 324) sandwiched between the p-doped region and the n-doped region. The p-doped region and the n-doped region have concentric ring shapes to sandwich the ring-shaped optical aperture 324. The fourth substrate 320 further includes at least one metal layer 325 on the second side, the at least one metal layer configured to be electrically coupled to the at least one light-responsive diode 322 on the second side. At least one set of alignment holes 331 are formed in the at least one set of third substrate 330. At least one set of alignment holes 321, which are aligned with the holes 331 in the assembled state of the optical system, are formed in the fourth substrate 320. At least one metal layer 332 is formed on the first side of the at least one set of third substrates 330 and configured to be electrically coupled to the at least one metal layer 325 on the second side of the fourth substrate 320.

Figure 3E:
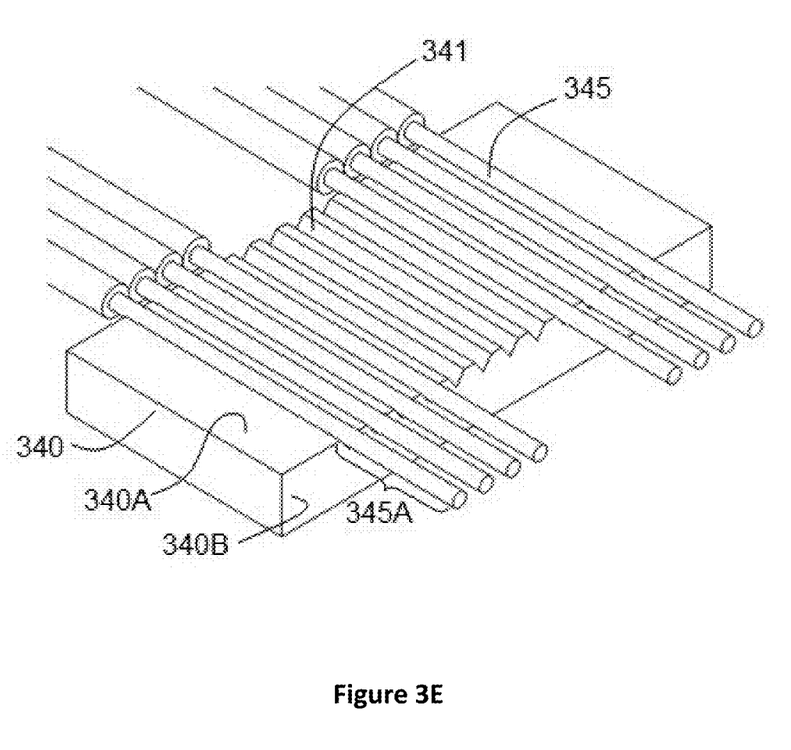
FIG. 3E schematically illustrates an enlarged isometric view of the fourth substrate (rotated) with the optical fibers of the optical system schematically illustrated in FIG. 3A.

FIG. 3E illustrates a rotated isometric views of the second substrate 340 with at least one optical fiber 345 (core/cladding, with the polymer protection layer partially removed from the fiber) mounted in the at least one pre-fabricated V-groove 341. Due to the introduction of the fourth substrate 320 for the additional monitor photodetector 322, the optical fiber should protrude out from the end face 340B of the second substrate 340 that is perpendicular to the first side 340A. The length of the protruding portion 345A is determined by the sum of the thickness of the fourth substrate 320, in the range of 400 µm to 700 µm if made of silicon substrate, and the distance from the optical surface of the optical components 311/312 (have a height between 100 µm to 400 µm if made of III-V substrate) to the second side 320B of the fourth substrate 320 in the assembled state (see FIG. 3A), so that the ends of the optical fibers 345 reach the proximity (in the range of a few micrometers to tens of micrometer depending on the design) of the optical surface of the mounted optical components 311/312.

The optical system is packaged in a similar sequence as the previous described embodiments. First, the at least one optical fiber core/cladding 345 are mounted in the V-grooves 341 of the fourth substrate, and the fourth substrate 320 is attached to the second substrate 340 such that the first side 340A and the V-grooves 341 of the second substrate 340 are perpendicular to the first side 320A of the fourth substrate 320. The at least one optical fiber core/cladding 345 is inserting through the at least one hole 323 (323A, 323B) fabricated in the fourth substrate 320. The at least one set of third substrates 330 are attached onto the fourth and second substrates 320 and 340 by inserting one or more alignment pins 326 through the holes 321 in the second substrate and through the alignment holes 331 in the at least one set of third substrates 330. In the same step, the electrical contact between the metal layers 325 and 332 of the second and third substrates is formed. The alignment pins 326 are optical fibers with the polymer protection layer partially removed. The entire module of the combination of the fourth, third and second substrates 320, 330, and 340 is positioned (e.g., after it is rotated) so that the first side 340A and the V-grooves 341 of the second substrate 340 are perpendicular to the first side 310A of the first substrate 310, and attached onto the first side 310A of the first substrate 310 by inserting the alignment pins 326 into the alignment holes 315 on the first substrate. The process brings the ends of optical fibers 345 to the proximity of the optical surface of the optical components 311/312. In this embodiment, the third substrates are used not only as spacers to control the distance between the end of the optical fibers and the optical components but also as electrical jumper to connect the in-line monitor photodetectors 322 to the external driving circuitry.

Figure 4A:
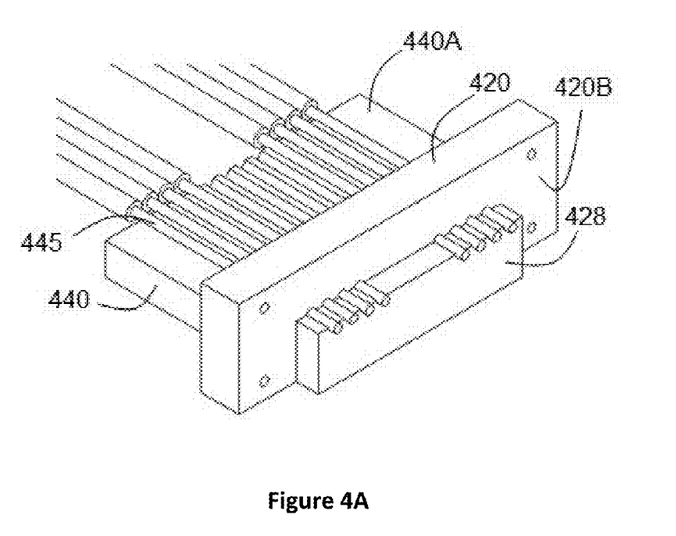
FIG. 4A schematically illustrates an isometric view of the assembled second and fourth substrates together with additional fiber supporting structure according to an alternative embodiment of the present invention.
Figure 4B:
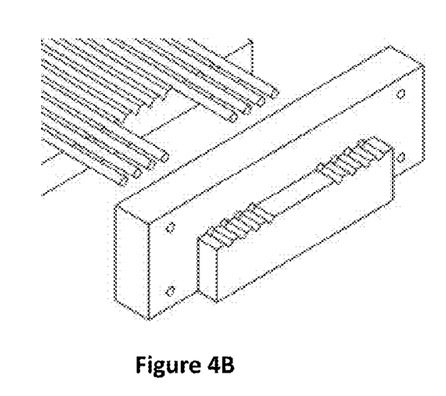
FIGS. 4B and 4C schematically illustrate exploded isometric views of the structure schematically illustrated in FIG. 4A.
Figure 4C:
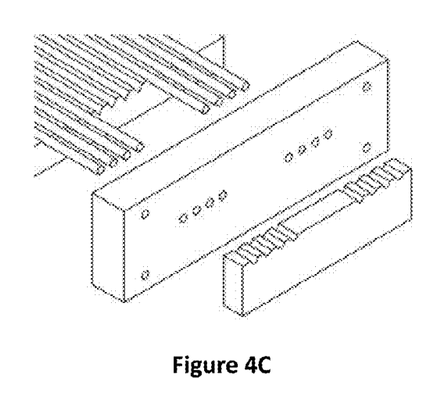

A variation of the combined module of the second and fourth substrates is illustrated in FIG. 4A. Compared to the embodiment illustrated in FIG. 3A-3B, a fiber support structure 428 is introduced. The exploded view of the combined structure is illustrated in FIGS. 4B and 4C. After the optical fibers 445 are assembled into the V-grooves on the first side 440A of the second substrate 440, the fourth substrate 420 is attached by inserting the optical fibers through the holes on the fourth substrate 420. The fiber support structure 428 is attached tightly on the second side 420B of the fourth substrate 420 with the optical fiber through the set of half-circular holes or grooves on the fiber support structure 428 to provide additional mechanical strength to the suspended optical fiber ends and reduce possible adverse effect of vibration. Alternatively, the fiber support structure can be formed by starting with a thicker substrate, and etching it down on one face to form a shape that is the same as the combined shape of the pieces 420 and 428 shown in FIG. 4A.

Figure 5:
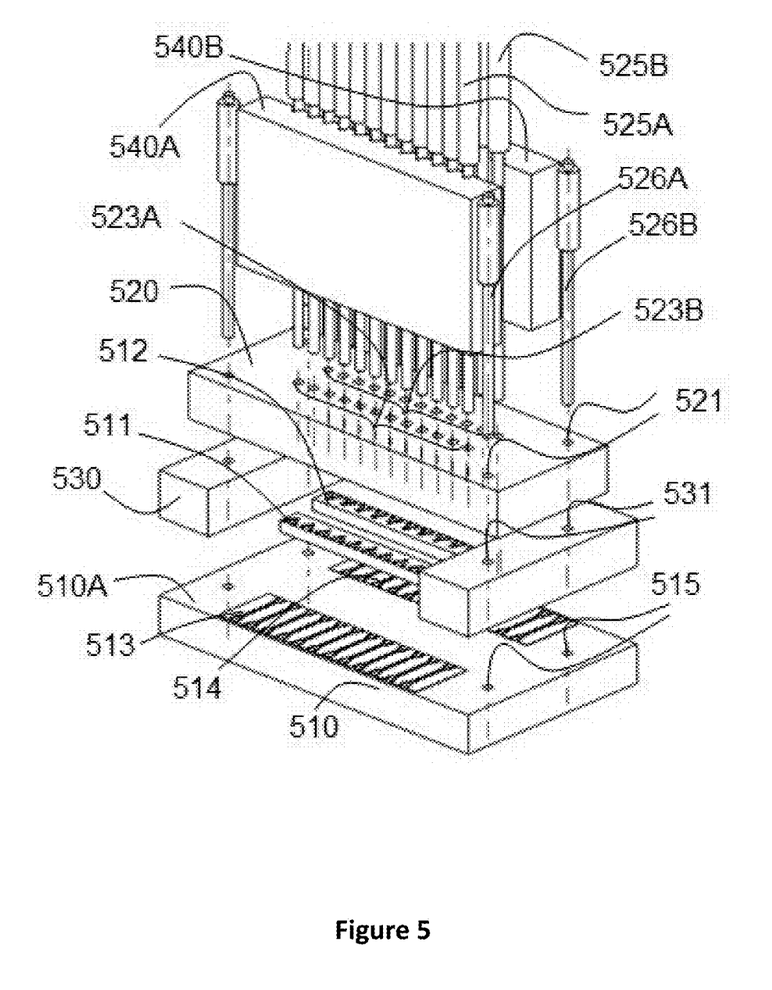
FIG. 5 schematically illustrates an exploded schematic isometric view of an exemplary optical system comprising two dimensional arrayed optical components and optical fibers as an example of extended optical system according to an alternative embodiment of the present invention.

In all embodiments, the optical fibers can be one or two dimensional optical fiber arrays. Correspondingly, the through holes, the V-grooves, and the optical components are also one or two dimensional arrays. According to current communication standards, 4 and 12 channel one dimensional parallel optical systems are commonly used. Two dimensional parallel optical systems may be used in even higher density per volume applications, such as the applications of board-to-board or on-board data communications in supercomputer systems. FIG. 5 schematically illustrates an exploded isometric view of an exemplary optical system having two dimensional arrayed optical components and optical fibers as an example of how the optical system illustrated in FIG. 3A may be extended. Other configurations to realized two-dimensional parallel optical systems are also possible with proper arrangement of the optical components and theirs driving circuitries.

As illustrated in FIG. 5, the optical system described in this embodiment includes a first substrate 510, a second substrate 520 arranged in parallel to the first substrate 510, at least one set of third substrates 530, and two fourth substrates 540A and 540B for respectively mounting transmitting and receiving optical fibers 525A and 525B, arranged perpendicular to the first substrate 510. Each substrate has a first side and a second side facing generally opposite to the first side. The two fourth substrates 540A and 540B, which are similar to the fourth substrate 340 in FIG. 3, are arranged in parallel to each other and perpendicular to the first side 510A of the first substrate 510 so that the optical fibers 525A and 525B are perpendicular to the first side 510A. At least one array of optical components 511 and 512 are mounted on the first side 510A of the first substrate 510 with the optical surfaces facing the optical path of the light emitted from or received by the optical fiber arrays 525A and 525B affixed on the fourth substrates 540A and 540B, respectively. The second substrate 520 has two arrays of holes 523A and 523B to receive optical fibers 525A and 525B corresponding to the transmitter component 511 and receiver component 512, respectively. The two set of fourth substrates 540A and 540B are assembled on the at least one set of third substrates 530 by inserting the optical fibers 525A and 525B through the fiber holes 523A and 523B in the second substrate 520. In-line photodetectors similar to that described in the embodiment illustrated in FIG. 3C can also be included in this configuration. The passive alignment of all substrates is realized by inserting alignment pins made of optical fibers 526A and 526B into the alignment holes 512, 531 and 515 on the second, third and first substrates 520, 530 and 510, respectively.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. An optical system comprising:
a first substrate having a first side;
at least one optical component mounted on the first side of the first substrate, wherein each of the at least one optical component has a first side and a second side facing opposite to the first side with an optical surface on the first side, wherein the optical surface is capable of detecting and/or emitting optical signals, and wherein the second side of the optical component is mounted onto the first side of the first substrate;
a second substrate having a first side with at least one fiber placement groove formed on the first side; and
at least one optical fiber placed inside the at least one fiber placement groove and having an exposed end;
wherein the first side of the second substrate and the at least one fiber placement groove are disposed perpendicular to the first side of the first substrate, and wherein the exposed end of the optical fiber is optically coupled with the optical surface of the at least one optical component,
a fourth substrate having a first side and a second side facing generally opposite to the first side, the first side and second side of the fourth substrate being parallel to the first side of the first substrate and perpendicular to the first side of the second substrate, the fourth substrate defining at least one fiber placement hole extending from its second side to its first side, the at least one fiber placement hole being aligned with the at least one fiber placement groove on the first side of the second substrate, wherein the at least one optical fiber penetrates through the at least one fiber placement hole; and
at least one third substrate including a first side and a second side facing opposite to the first side, the at least one third substrate being disposed between the first substrate and fourth substrate with the first and second sides of the third substrate being in contact with the first side of the first substrate and the second side of the fourth substrate, respectively, wherein a gap is defined between the first side of the first substrate and the second side of the fourth substrate and the at least one optical component is partially disposed within the gap,
wherein the optical surface of the at least one optical component includes at least one laser diode, wherein the fourth substrate includes at least one photodetector on its second side configured to receive an optical signal emitted from the at least one laser diode to generate an electrical signal indicative of an intensity of the optical signal.

2. The optical system of claim 1, wherein the at least one fiber placement groove includes a one or two dimensional array of grooves, the at least one optical fiber includes an array of optical fibers, and the at least one optical component includes an array of photodetectors or laser diodes.

3. The optical system of claim 1, wherein each of the third and fourth substrates has at least one alignment hole extending between its second side and its first side, wherein the first substrate has at least one alignment hole extending into the first substrate from its first side, wherein the respective alignment holes of the first, third and fourth substrates are aligned with each other, the optical system further comprising at least one alignment pin extending through the alignment holes of the first, third and fourth substrates that are aligned with each other.

4. The optical system of claim 1, wherein the first substrate further includes at least one metal layer at the first side, the at least one metal layer configured to be electrically coupled to at least one optical component mounted on the first side.

5. The optical system of claim 1, wherein the fourth substrate further includes at least one fiber support structure, with at least one etched groove or through hole, mounted or etched on the second side of the fourth substrate.

6. The optical system of claim 1, wherein the at least one photodetector includes a light-responsive p-i-n diode or p-n diode having concentric ring-shaped regions including a p-doped region, an n-doped region, and a region sandwiched between the p-doped region and the n-doped region, the concentric ring-shaped regions surrounding one of the at least one fiber hole on the second side of the fourth substrate.

7. The optical system of claim 1, wherein the fourth substrate further includes at least one metal layer on its second side, the at least one metal layer configured to be electrically coupled to the at least one photodetector.

8. The optical system of claim 7, wherein the third substrate further includes at least one metal layer on its first side, the at least one metal layer configured to be electrically coupled to at least one metal layer on the second side of the fourth substrate.

9. A method of fabricating an optical system, the method comprising:

providing a first substrate having a first side;

mounting at least one optical component on the first side of the first substrate, each of the at least one optical component having a second side mounted onto the first side of the first substrate and a first side facing opposite to the second side with an optical surface including a laser diode on the first side;

providing a fourth substrate having a first side and a second side facing opposite to the first side;

forming at least one hole extending between the second side and the first side of the fourth substrate;

forming at least one photodetector on the second side of the fourth substrate;

providing at least one third substrate having a first side and a second side facing opposite to the first side;

placing the at least one third substrate between the first side of the first substrate and second side of the fourth substrate, wherein the at least one photodetector is optically coupled with the laser diode mounted on the first side of the first substrate, the at least one photodetector being responsive to an optical signal from the laser diode to generate an electrical signal indicative of an intensity of the optical signal;

providing a second substrate having a first side;

forming at least one fiber placement groove on the first side of the second substrate;

placing at least one fiber inside the at least one fiber placement groove with an end of the fiber protruding from an end face of the second substrate; and placing the second substrate on the first side of the fourth substrate such that the first side of the second substrate and the at least one fiber placement groove are perpendicular to the first side of the fourth substrate, and inserting the protruded end of the at least fiber into the at least one hole of the fourth substrate;

wherein each of the third and fourth substrates has at least one alignment hole extending between its second side and its first side, wherein the first substrate has at least one alignment hole extending into the first substrate from its first side, wherein the respective alignment holes of the first, third and fourth substrates are aligned with each other, the method further comprising inserting at least one alignment pin through the alignment holes in the at least one third substrate and the at least one fourth substrate, and further inserting the at least one alignment pin into the at least one alignment hole in the first substrate.

10. The method of claim 9, wherein the step of forming at least one photodetector on the second side of the second substrate comprises:

forming at least one light-responsive diode on the second side having a p-doped region, an n-doped region, and a region sandwiched between the p-doped region and the n-doped region; and forming at least one metal layer on the second side, the at least one metal layer configured to be electrically coupled to the at least one light-responsive diode on the second side.

11. The method of claim 9, wherein the at least the at least one third substrate further includes at least one metal layer on its first side, and wherein the at least one metal layer on the first side of the at least third substrate is electrically coupled to the at least one metal layer on the second side of the second substrate.

* * * * *